J. SEVERANCE.
SAFETY APPLIANCE.
APPLICATION FILED MAR. 24, 1913.
1,103,894.
Patented July 14, 1914.
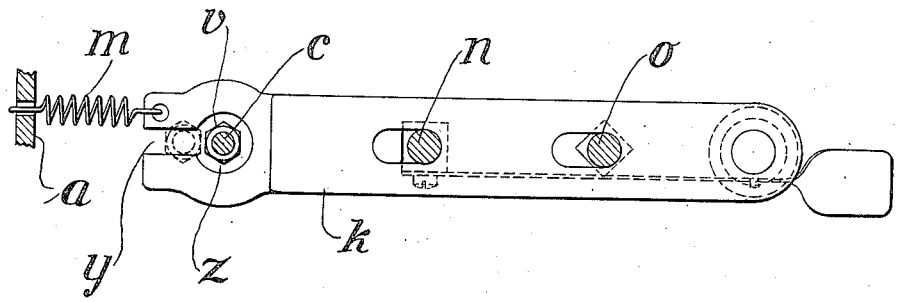
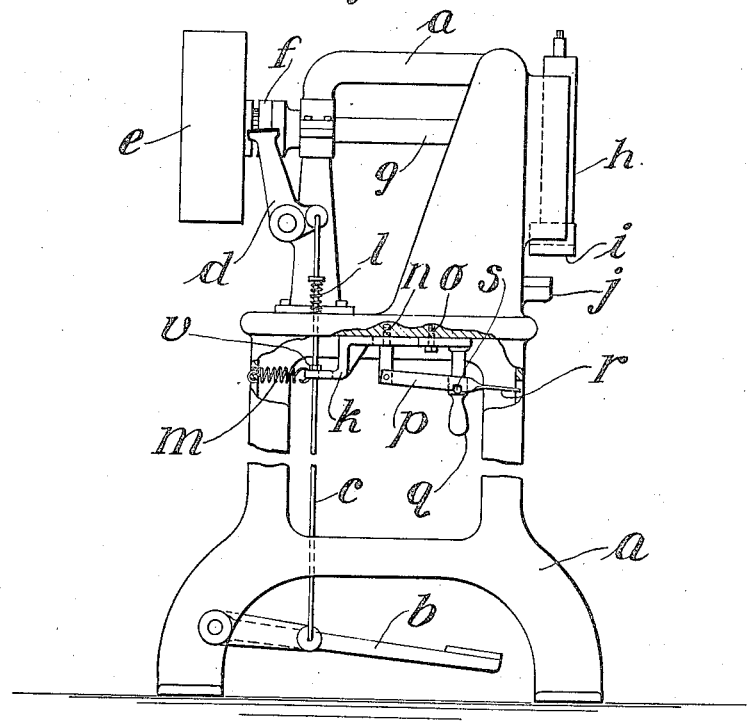
WITNESSES:
H. E. Hartwell.
M. A. Hunter
INVENTOR.
John Severance.
BY
Chapin & Co.
ATTORNEY.

UNITED STATES PATENT OFFICE.

JOHN SEVERANCE, OF SPRINGFIELD, MASSACHUSETTS, ASSIGNOR TO MILTON BRADLEY COMPANY, OF SPRINGFIELD, MASSACHUSETTS, A CORPORATION OF MASSACHUSETTS.

SAFETY APPLIANCE.

1,103,894.  Specification of Letters Patent.  Patented July 14, 1914.

Application filed March 24, 1913. Serial No. 756,454.

*To all whom it may concern:*

Be it known that I, JOHN SEVERANCE, a citizen of the United States of America, residing at Springfield, in the county of Hampden and State of Massachusetts, have invented new and useful Improvements in Safety Appliances, of which the following is a specification.

This invention relates to a safety device for use with power machines. It is especially adapted for machines such as are set in operation by an intermittent operation of a foot-treadle. Such machines are well-known in all lines of manufacture. The more common examples are the ordinary foot-press and box-staying machines.

While the invention is especially useful for machines of the special class mentioned, the elements of the invention may be applied, broadly, to machines of many different classes.

The broad object of the invention is to provide a mechanism or device designed to prevent the operation of the machine when the operator does not intend to have it operate.

The special object of the invention is to provide a safety device or lock for machines of the class described which the operator may set whenever it is necessary to stop the machine for repairs or other purposes and where an accidental starting of the machine, in the absence of such a safety device, might cause injury to the operator.

With these objects in view, applicant shows in the accompanying drawings a preferred form of his invention for the purpose of illustrating one way in which the invention may be carried out.

Referring to the drawings,—Figure 1 is a plan view of the essential features of the safety device separated from the machine, parts of the machine being shown in section. Fig. 2 is a side view of a machine to which the invention may be applied with parts broken away to better show the arrangement of the locking device with relation to the machine.

The machine shown for the purpose of illustration is any well-known form of treadle-operated mechanism. In this particular instance, a box-staying machine is indicated. The applicant makes no claim whatever to the machine itself and calls attention to the fact that the invention, as shown applied to the machine, is only for the purposes of illustrating the invention and not with any idea of limiting the invention to the specific form shown.

Referring to Fig. 2, $a$ represents the box-staying machine of a well-known form in which the driving-pulley $e$ operates to rotate a shaft $g$ when connected to the same by means of a clutch $f$. The shaft $g$ has mechanism arranged which operates in connection with the slide $h$ to reciprocate the movable member $i$ which coöperates with the stationary member $j$ to do the work desired. The clutch $f$ is operated by means of a foot-treadle $b$ which normally is in an upper position, due to spring $l$ on rod $c$, and, when operated, takes a lower position in order to turn the bell-crank-lever $d$ on its pivot and cause the clutch $f$ to connect pulley $e$ with the shaft $g$ so that the latter will be driven. The clutch $f$ is the well-known form such as is used in foot-presses and in punch-presses as well as in devices of the character shown.

Whenever it is necessary to make any repairs on the machine or adjust the same while the pulley $e$ is running, the ordinary method is for the operator to merely remove his foot from the treadle $b$ and go about making the necessary repairs or adjustments. The danger in this method resides in the fact that the foot-treadle $b$, or a corresponding part in another machine, is liable, at any time, to be accidentally operated, thus immediately throwing the clutch $f$, or its corresponding part in another machine, so that the operating parts go through one cycle of operations. This accidental throwing of the clutch $f$ has been the cause of many accidents, due to the unexpected operation of the parts, and applicant's device is particularly designed to avoid the possibility of such accidental and unexpected operation.

The specific device shown in the drawings will now be described.

Fastened to the underside of the table-plate of the machine is a casting $k$, formed as shown in the drawings, which is supported by means of bolts $n$ and $o$ which pass through elongated slots in the casting $k$, as shown in Fig. 1. The enlarged ends of these bolts hold the casting $k$ in place and allow a limited horizontal movement in a crosswise direction of the machine. Fastened to the end of the casting $k$ is a spring $m$ which is also fastened to the frame $a$ of the machine. This spring acts normally to pull the casting $k$ into its rearmost position, in which position the nut $v$ placed on the treadle-operating-rod $c$ may pass through a hole $z$ in the casting.

The parts are shown in their normal position in Fig. 1, in which position rod $c$ is free to move up and down in order to operate the clutch $f$ in the manner described. Assuming that the operator desires to make some repairs or adjustments in the machine, the following operations take place in order to set the parts as shown in Fig. 2 into locking position. The operator takes hold of the handle $q$ and slides the casting $k$ toward the front of the machine, such movement being limited by the slots through which the bolts $n$ and $o$ pass. This action takes place against the force of the spring $m$. Fastened to the handle $q$ is a small pin $s$, as indicated in Fig. 2, which coöperates with a notch in the loosely-pivoted arm $p$, whose inner end is pivoted at a point on the lower end of the bolt $n$. The forward end of this arm $p$ is made into a handle $r$ for convenient manipulation. The end of the arm $p$, as it rides on the pin $s$, will cause the notch in the arm $p$ to embrace the pin $s$ in the handle $q$ as soon as this pin is pulled to the proper position. When the parts have been set, as shown in Fig. 2, the operating rod $c$ extends through a narrow throat portion $y$, extending from the hole $z$ to the end of the casting $k$. With the rod $c$ extending through this slot, the nut $v$ cannot move downwardly for the shoulders of the nut rest on the top of the casting $k$. Thus, it is impossible, with the parts in the position described, to press the foot on the treadle $b$ and lower the rod $c$. The repairs and adjustments necessary are then made, and, when the operator desires to again start the machine, it is necessary to reach his hand under the machine and take hold of the handle portion $r$ and lift the lever $p$ in order to release the pin $s$ from the slot. The spring $m$ will immediately return the casting $k$ to its rearmost position, as shown in full lines in Fig. 1, in which position the parts are all ready to operate.

By the arrangement described, it will be seen that the entire machine can be very conveniently locked whenever desired, and, after it has been locked, there is little or no danger of it being unlocked accidentally since the operator must intentionally unlock the parts before the treadle $b$ can be operated to work the clutch $f$.

What I claim, is,—

1. In a safety device, a clutch, a rod for operating said clutch, normally inoperative means for locking said rod in inoperative position, means for shifting said first named means to locking position, means for locking said means in said locking position, and means for moving said rod locking means back to inoperative position upon release of said last named locking means.

2. An apparatus of the class described, comprising, in combination, an operable machine, a clutch therein arranged to start a cycle of operations when moved in one direction, a rod having an abutting part movable to shift said clutch, a locking-device having an abutting part movable into position to prevent the shifting movement of the rod by contact with its abutting part, means to normally hold the locking-device in inoperative position, and an automatic device to hold the locking-device in operative position when moved to that position, said automatic device being arranged to be released at will and permit the locking-device to assume a normal position, all for the purpose described.

JOHN SEVERANCE.

Witnesses:
 F. G. NEAL,
 M. A. HUNTER.